United States Patent
Yamaguchi et al.

[11] Patent Number: 6,102,175
[45] Date of Patent: Aug. 15, 2000

[54] TORQUE CONVERTER

[75] Inventors: Mitsugu Yamaguchi, Hirakata; Masaki Mori, Shiga, both of Japan

[73] Assignee: Exedy Corporation, Osaka, Japan

[21] Appl. No.: 09/365,203

[22] Filed: Aug. 2, 1999

[30] Foreign Application Priority Data

Aug. 6, 1998 [JP] Japan .................................. 10-222908

[51] Int. Cl.$^7$ ................................................ F16H 45/02
[52] U.S. Cl. .......................................... 192/3.29; 60/365
[58] Field of Search ..................................... 192/3.29, 3.3, 192/3.33; 74/730.1, 732.1; 29/889.5; 60/365

[56] References Cited

U.S. PATENT DOCUMENTS

| | | | |
|---|---|---|---|
| 2,328,393 | 8/1943 | Neracher et al. | 60/365 |
| 2,358,469 | 9/1944 | Neracher | 60/365 |
| 2,841,262 | 7/1958 | Zeidler | 192/3.33 X |
| 5,441,135 | 8/1995 | Worner et al. | 192/3.29 |
| 5,636,718 | 6/1997 | Nomoto et al. | 192/3.29 X |

*Primary Examiner*—Rodney H. Bonck
*Attorney, Agent, or Firm*—Shinjyu Global IP Counselors, LLP

[57] ABSTRACT

A torque converter includes a front cover, an impeller, a turbine, a stator and a lockup clutch piston. The lockup clutch piston is located between the front cover and the turbine and is engaged and dis-engaged in response to changes in hydraulic pressure around the piston. The turbine shell is provided at the outer peripheral portion with a flange or projection (61) that extends radially outward toward an inner wall surface (66) and (67) of an impeller shell (22) for limiting fluid flow from around the piston into an area between the turbine and impeller.

7 Claims, 2 Drawing Sheets

TORQUE CONVERTER

BACKGROUND OF THE INVENTION

A. Field of the Invention

The invention relates to a torque converter, and particularly to a torque converter provided having a lockup device that operates in response to change in hydraulic pressure within portions of the torque converter.

B. Description of the Background Art

A torque converter is a device that includes three kinds of vane wheels, an impeller, a turbine and a stator, which together provide a means for transmitting torque via an internal working fluid. The impeller is fixed to a front cover of the torque converter, the front cover being configured to receive inputted torque. The impeller includes an impeller shell which together with the front cover surrounds and defines a fluid chamber filled with the working fluid. The turbine is located within the fluid working chamber And faces the impeller. A main drive shaft of a transmission is connectable to the turbine. When the impeller rotates, the working fluid flows from impeller blades of the impeller shell toward the turbine, thereby causing the turbine to rotate. Consequently, the turbine transmits torque to the main drive shaft of the transmission.

A lockup device is a mechanism, which is disposed in a space between the front cover and the turbine for mechanically coupling the front cover to the turbine and thereby directly transmitting the torque therebetween. The lockup device typically includes a piston and an elastic coupling mechanism for coupling the piston to an output member such as a turbine. The piston is, e.g., a circular plate-like member, and divides the space between the front cover and the turbine into a first hydraulic chamber adjacent to the front cover and a second hydraulic chamber adjacent to the turbine. As a result, the piston can move toward and away from the front cover in accordance with changes in hydraulic pressure between the first and second hydraulic chambers. A friction engaging portion having a friction facing is formed on the front cover side of an outer peripheral portion of the front cover. When the working fluid in the first hydraulic chamber is drained to increase relatively the pressure in the second hydraulic chamber, the piston moves toward the front cover so that the friction facing is pressed against the friction surface of the front cover.

The elastic coupling mechanism is formed of, e.g., a drive member fixed to the piston, a driven member coupled to the turbine and elastic members such as coil springs arranged between the drive and driven members for transmitting torque and absorbing vibrations and fluctuations in the torque.

In order to engage the lock-up clutch, the working fluid in the first hydraulic chamber is drained, and the working fluid is allowed to flow into the second hydraulic chamber. As a result, the pressure in the second hydraulic chamber increases relative to the pressure in the first hydraulic chamber. As a result the piston moves toward the front cover.

However, under some operating conditions, as the working fluid is urged from the impeller blades toward the turbine, the fluid pressure in the torque converter proximate the radial outer edges of the turbine and impeller blades may be lower than the fluid pressure in the second hydraulic chamber. As a result the working fluid may be may be drawn out of the second hydraulic chamber into the turbine. Consequently, the pressure in the second hydraulic chamber may lowered to a value lower than or equal to that in the first hydraulic chamber. If the pressure in the second hydraulic chamber is reduced too much, the piston may not be moved toward the front cover, and the lockup clutch will not be engaged. Under some conditions, the fluid pressure in the second hydraulic chamber may be lowered but still be sufficient enough to cause engagement of the lockup clutch. However, the engagement time or response time for engagement of the lockup clutch may be increased, i.e. it may take a relatively long time for the lockup clutch to become engaged. Preferably, the response time for engagement of the lockup clutch should be as short a period of time as possible.

SUMMARY OF THE INVENTION

One object of the invention is to improve the response time for engagement of a lockup clutch in a torque converter.

In accordance with one aspect of the present invention, a torque converter for transmitting torque of an engine to a transmission via a working fluid includes a front cover for receiving torque from the engine. An impeller shell is fixed to the front cover defining a fluid chamber therebetween. A plurality of impeller blades are fixed to an inner side the impeller shell, and a turbine shell is disposed in the fluid chamber adjacent to the impeller blades. The turbine shell and the impeller shell define a fluid working chamber therebetween within the fluid chamber. A stator is disposed within the fluid working chamber between radially inner portions of the impeller shell and the turbine shell. A lockup clutch mechanism is disposed between the front cover and the turbine shell. The lockup clutch mechanism includes a piston. A first hydraulic chamber is defined between the front cover and the piston and a second hydraulic chamber is defined between the piston and the turbine shell. A radially outward portion of the turbine shell is formed with an annular radially extending flange that restricts fluid flow between the fluid working chamber and the second hydraulic chamber.

Preferably, the flange extends radially outward beyond a radially outermost edge of the impeller blades.

Preferably, the turbine shell includes the flange and an annular portion that supports a plurality of turbine blades, the flange extending radially outward from the annular portion of the turbine shell by a distance of at least 1 mm.

Preferably, the flange has an outer peripheral surface and the impeller shell is formed with an outer cylindrical portion having an inner radial surface that confronts the outer peripheral surface of the flange. The flange has an annular surface perpendicular to the outer peripheral surface. The impeller is formed with an annular portion that extends between the impeller blades and the outer cylindrical portion. The annular surface of the flange confronts an adjacent surface of the annular portion of the impeller.

Preferably, the inner radial surface of the impeller shell is spaced apart from the outer peripheral surface of the flange by a distance of no more than 5 mm.

Preferably, the annular surface is spaced apart from the adjacent surface of the annular portion of the impeller by a distance of no more than 5 mm.

According to the torque converter of the present invention, the turbine shell is provided at its outer periphery with the flange facomg the inner surface of the impeller shell. This structure reduces a sectional area through which the fluid can flow between the second hydraulic chamber and the fluid working chamber thereby restricting fluid flow therebetween. Restriction in fluid flow results in an improved response time for lockup clutch piston engagement, compared with the prior art configurations.

These and other objects, features, aspects and advantages of the present invention will become more fully apparent from the following detailed description of the present invention when taken in conjunction with the accompanying drawings where like reference numerals denote corresponding parts throughout.

DESCRIPTION OF THE PREFERRED EMBODIMENTS

Figure 1:
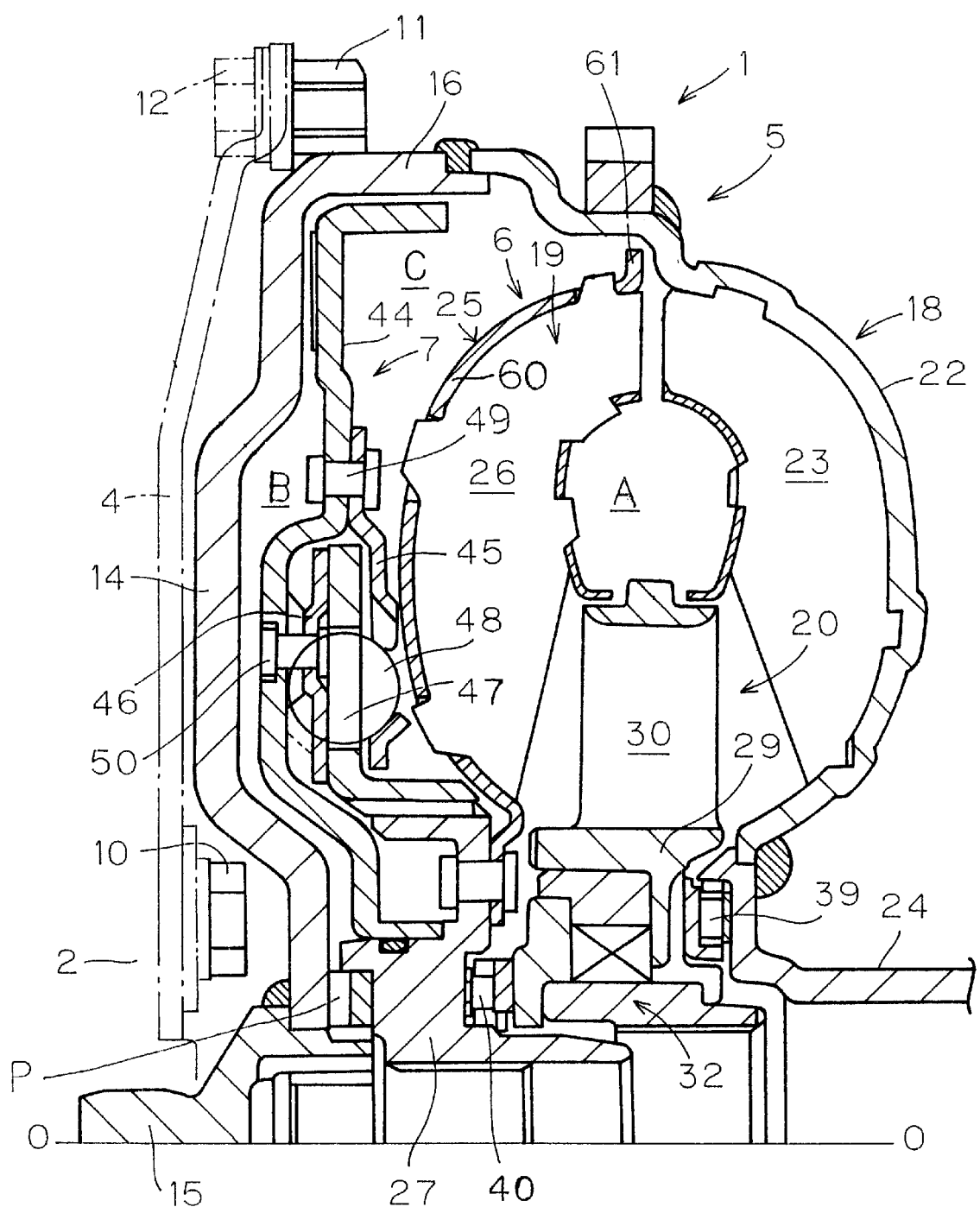
FIG. 1 is a fragmentary cross sectional side view of a torque converter in accordance with one embodiment of the present invention.

FIG. 1 shows a torque converter assembly 1 in accordance with one embodiment of the present invention. The torque converter assembly 1 is preferably used in an automotive vehicle between an engine (not shown) and a transmission (not shown). The torque converter assembly 1 is a device for transmitting torque from a crank shaft 2 of the engine to an input shaft (not shown) of the transmission. The engine is located on the left side in FIG. 1, and the transmission (not shown) is located on the right side in FIG. 1. In FIG. 1, O—O indicates a rotation axis of the torque converter assembly 1. Hereinafter, the term engine side refers to the left side of FIG. 1 and the term transmission side refers to the right side of FIG. 1.

In FIG. 1, the torque converter assembly 1 is connected to a flexible plate 4 that is in turn connected to the crankshaft 2. The torque converter assembly 1 includes the flexible plate 4 and a torque converter 5. The flexible plate 4 is formed of a circular thin plate, and is arranged for transmitting the torque and absorbing bending vibrations transmitted from the crank shaft 2. The inner peripheral portion of the flexible plate 4 is fixed to the end of the crank shaft 2 by a plurality of bolts 10. A plurality of circumferentially spaced nuts 11 are fixed to an outer peripheral portion of a front cover 14. Bolts 12 engaged with the nuts 11 fix the outer peripheral portion of the flexible plate 4 to the front cover 14.

The torque converter 5 is basically formed of an impeller shell 22 and the front cover 14. A fluid working chamber A having a torus shape is defined within a portion of the torque converter 5. Specifically, the fluid working chamber A is defined between the impeller shell 22 and a turbine 19. There are three types of vane wheels within the fluid working chamber A, an impeller 18, the turbine 19 and a stator 20. Further, a lockup device 7 is disposed within the torque converter 5 between the turbine 19 and the front cover 14.

The front cover 14 is a circular plate-like member, and is attached to the flexible plate 4 by the bolts 12. A center boss 15 is welded to the inner peripheral portion of the front cover 14. The center boss 15 is an axially extending member that is fitted into a central hole (not shown) of the crank shaft 2 restricting radial movement of the torque converter 5.

The front cover 14 is formed at its outer periphery with an radially outer cylindrical portion 16 which extends axially toward the transmission side. The end of the radially outer cylindrical portion 16 is welded to an outer periphery of an impeller shell 22 of the impeller 18. As a result, the front cover 14 and the impeller 18 form a fluid chamber filled with working oil (working fluid), the fluid working chamber A being defined in a portion of the fluid chamber of the torque converter 5.

The impeller 18 is basically formed of the impeller shell 22 and a plurality of impeller blades 23 fixed to the inner surface of the impeller shell 22. An impeller hub 24 is fixed to the inner periphery of the impeller shell 22.

The turbine 19 is disposed in the fluid chamber, and is located on the engine side of the torque converter 5 with respect to the impeller 18. As stated above, the turbine 19 and the impeller shell 22 define the fluid working chamber A within the fluid chamber of the torque converter 5. The turbine 19 is basically formed of a turbine shell 25 and a plurality of turbine blades 26 fixed to the surface of the turbine shell 25 such that the turbine blades 26 face the impeller 18. The inner peripheral portion of the turbine shell 25 is fixed to a turbine hub 27 by a plurality of rivets. The inner periphery of the turbine hub 27 is non-rotatably coupled to the shaft (not shown) extending from the transmission (not shown).

The stator 20 is a mechanism for controlling flow of the working fluid from the turbine 19 to the impeller 18. The stator 20 is arranged between radial inward portions of the impeller 18 and the turbine 19. The stator 20 is basically formed of a carrier 29 and a plurality of stator blades 30 arranged on the outer peripheral surface of the carrier 29. When installed in an automotive vehicle or similar application, the carrier 29 is supported on a stationary shaft (not shown) that extends from the transmission (not shown) via a one-way clutch 32.

Description is now given to the structure of the lockup device 7. The lockup device 7 is located between the front cover 14 and the turbine 19. The lockup device 7 is basically formed of a piston 44 and a damper mechanism 31 (elastic coupling mechanism). The piston 44 operates as clutch for selectively mechanically coupling with the front cover 14 and the turbine 19 together. When the piston 44 is engaged with the front cover 14, the damper mechanism 31 transmits torque from the piston 44 to the turbine hub 27. As well, the damper mechanism 31 absorbs and dampens torsional vibrations during toque transmission.

The piston 44 is a circular plate-like member having an inner periphery that contacts a portion of the turbine hub 27. An outer periphery of the piston 44 extend proximate the radially outer cylindrical portion 16 but does not contact the radially outer cylindrical portion 16. The piston 44 divides the space between the front cover 14 and the turbine 19 into two separate chambers, specifically, a first hydraulic chamber B formed between the front cover 14 and the piston 44, and a second hydraulic chamber C formed between the piston 44 and the turbine 19. The piston 44 can be axially moved in response to pressure differences between the first and second hydraulic chambers B and C. More specifically, when the pressure in the first hydraulic chamber B is lowered below the pressure in the second hydraulic chamber C, the piston 44 moves toward the front cover 14 and is pressed into engagement with the front cover 14.

An annular friction facing having a predetermined radial width is fixed to a surface of the radially outer portion of the piston 44 facing an adjacent portion of the front cover 14. The front cover 14 is provided with a flat and annular friction surface opposed to the friction facing. The piston 44 is provided at a outer peripheral portion thereof with an axially extending radially outer cylindrical portion that extends toward the transmission side. The radially outer cylindrical portion of the piston 44 is radially spaced apart from the inner periphery of the radially outer cylindrical portion 16 by a generally small radial distance. The piston 44 is provided at an inner periphery thereof with a radially inner cylindrical portion extending axially toward the transmission side. The radially inner cylindrical portion of the piston 44 contacts the on the outer peripheral surface of the turbine hub 27 but is free to rotate and move in axial direction with respect to the turbine hub 27. An oil passage P connecting the first hydraulic chamber B to a hydraulic operation mechanism (not shown) is formed between the inner periphery of the front cover 14 and the turbine hub 27. Owing to this oil passage, the working fluid can be supplied into and drained from the first hydraulic chamber B.

The outer peripheral portion of the first hydraulic chamber B is in communication with the fluid working chamber A via the second hydraulic chamber C when the device 7 is in the clutch-released state. In the clutch-engaged state, friction facing of the piston 44 is engaged with the flat and annular friction surface of the front cover 14 and therefore, the first hydraulic chamber B is closed off from the second hydraulic chamber C and the fluid working chamber A.

Description is now given on the structure of the damper mechanism 31. The damper mechanism 31 is basically formed of first and second drive plates 45 and 46 functioning as members on the drive side, a driven plate 47 and springs 48 which elastically couple the drive plates 45 and 46 to the and driven plate 47 in the rotating direction. The springs 48 are compressed in the rotating direction in response to relative rotation between the drive plates 45 and 46, and driven plate 47.

The first drive plate 45 is a circular plate-like member having an outer peripheral portion fixed to the piston 44 by a plurality of rivets 49. The first drive plate 45 has radially middle and inner portions which extend from the radially middle portion of the piston 44 such that the driven plate 47 extends therebetween. The second drive plate 46 is located between the radially middle portion of the piston 44 and the first drive plate 45 such that the driven plate 47 extends between the first drive plate 45 and the second drive plate 46. The second drive plate 46 is fixed to the piston 44 by a plurality of rivets 50. The first and second drive plates 45 and 46 are provided with support portions for supporting the circumferentially opposite ends of the springs 48, described below.

The driven plate 47 is a circular plate-like member, and is disposed axially between the first and second drive plates 45 and 46. The driven plate 47 is provided with windows corresponding to the support portions of the first and second drive plates 45 and 46. The springs 48 are disposed in the windows of the driven plate 47 and further disposed between the first and second support portions of the first and second drive plates 45 and 46. Each spring 48 is a circumferentially extending torsion spring having a coil-like form. The circumferentially opposite ends of the springs 48 are supported in the windows and between the first and second support portions of the first and second drive plates 45 and 46. The driven plate 47 is provided at its inner periphery with a cylindrical portion that extends in an axial direction toward the transmission. The inner peripheral surface of the cylindrical portion of the driven plate 47 is engaged non-rotatably with the outer peripheral surface of the turbine hub 27 but may undergo limited axial movement with respect thereto.

Figure 2:
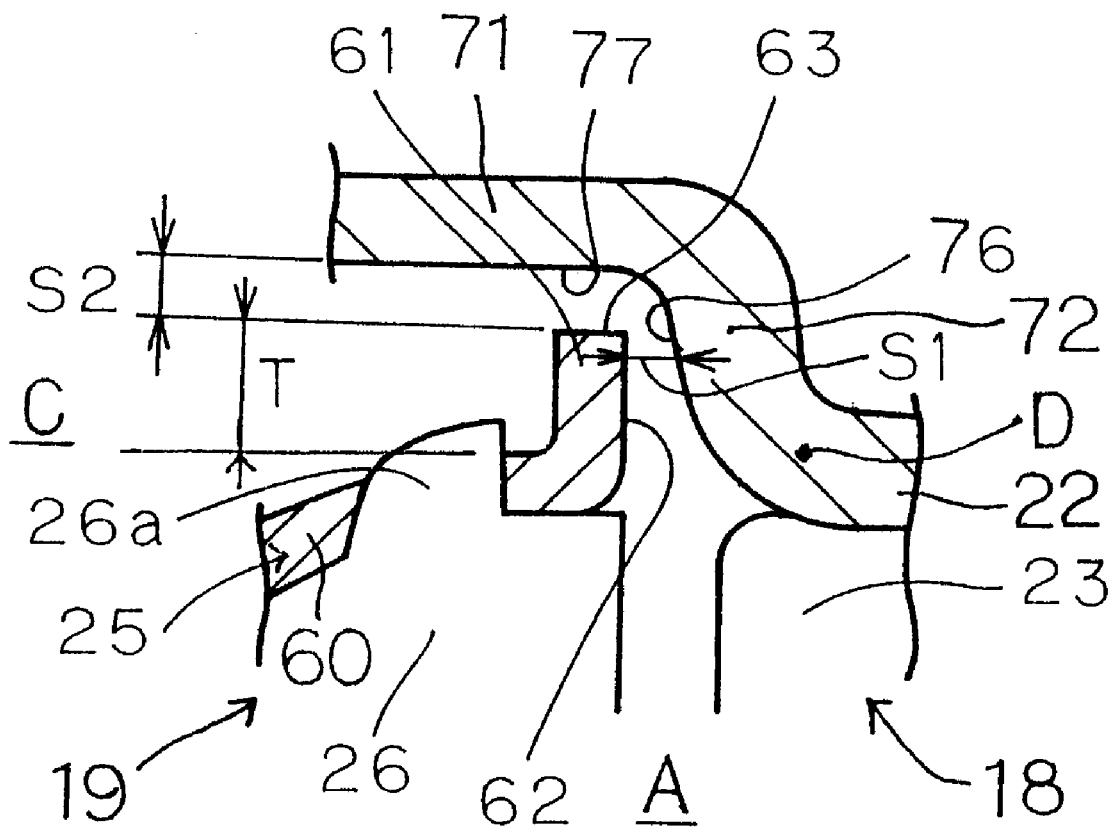
FIG. 2 is a fragmentary cross sectional side view of a portion of the torque converter depicted in FIG. 1, on an enlarged scale.

The present invention is described below in greater detail with reference to FIG. 2.

The outer peripheral portion of the impeller 18 extends to a position adjacent to but spaced apart from the outer peripheral portion of the turbine 19. During operation of the torque converter, the fluid flows out of the outer peripheral portion of the impeller 18 toward and into the outer peripheral portion of the turbine 19. Therefore, the outer peripheral portion of the impeller 18 is an outlet of the impeller 18 and the outer peripheral portion of the turbine 19 is an inlet of the turbine 19. As is clearly shown in FIG. 2, the outlet of the impeller 18 is located axially close to the inlet of the turbine 19.

The fluid working chamber A is in fluid communication with the second hydraulic chamber C via space between the outlet of the impeller 18 and the inlet of the turbine 19 and space between the impeller shell 22 and the turbine shell 25. The impeller shell 22 has a portion which extends axially beyond the radially outer end of the impeller blade 23 toward the engine side, covers the outer periphery of the turbine shell 25 and has an end fixed to the radially outer cylindrical portion of the front cover 14, as described in greater detail below.

The radially outer edge of the turbine blade 26 is located near the radially outer edge of the impeller blade 23 and the portion of the impeller shell 22 extending axially beyond the impeller blade 23 toward the engine. The turbine shell 25 is provided at its radially outer edge with a radially outward projection 61. The projection 61 of the turbine extends substantially radially outward from the inlet of the turbine blades 26. The projection 61 is a flange extending radially outward. The turbine shell 25 has an annular portion 60 having a curved section extending along the rear surface of the turbine blade 26, and the projection 61 taking the form of a flange on the outer periphery of the annular portion 60. A rounded corner is formed between the radially outermost portion of the annular portion 60 and the projection 61. The projection 61 has an annular shape extending continuously around the annular portion 60 in a circumferential direction and has a radial extending surface 62 that is substantially normal to the rotation axis of the torque converter assembly 1, as shown in the cross sectional view in FIG. 2. The surface 62 axially faces the transmission side.

The axially facing surface 62 is substantially parallel to the inlet end surface of the turbine blade 26. This projection 61 restricts, but does not completely block fluid communication between the chambers A and C by narrowing the passage area of the annular space located radially outward from the impeller shell 22 and the turbine blade 26. This suppresses flow of the working fluid from the second hydraulic chamber C into the fluid working chamber A during the lockup engagement operation.

The projection 61 extends radially outward by a length T from the outer periphery of the annular portion 60. The length T is preferably 1 mm or less. The projection 61 is located radially outside the turbine blade 26, and extends radially outward beyond the radially outermost portion of the turbine blade 26 (a claw 26a in the radially outermost portion of the turbine blade 26 shown in FIG. 2).

The impeller shell 22 has a portion D, which is in contact with the radially outer edge of the impeller blades 23. An annular middle portion 72 of the impeller shell 22 further extending radially outward from the portion D. A cylindrical portion 71 having a larger inner diameter than the outer diameter of the impeller blade 23 extends continuously from the annular middle portion 72. One side of the cylindrical portion 71 is formed with an inner peripheral surface 77 (first inner wall surface) that faces radially inward and therefore faces a radially outer surface of the turbine 19. The middle portion 72 has an axially facing surface 76 (second inner wall surface) that axially faces the projection 61.

The foregoing structures of the projection 61 and the impeller shell 22 as well as the relationship between them can achieve several synergistic effects described below.

The axially facing surface 62 of the projection 61 faces the surface 76 of the impeller shell 22 defining an axial space S1 therebetween. The axial space S1 between the surfaces 62 and 76 is preferably 5 mm or less. The outer peripheral surface 63 of the projection 61 faces the inner peripheral surface 77 of the impeller shell 22 defining a radial space S2 therebetween. Preferably, the radial space S2 is 5 mm or less.

As described above, the spaces S1 and S2 are continuous with each other so that the working fluid in the second hydraulic chamber C can flow into the fluid working chamber A but the flow is severally restricted. In particular, working fluid that might flow in an axial direction from the second hydraulic chamber C must pass through the space S2, and then collides with the axially facing surface 76, thereafter, the working fluid must flow radially inward through the space S1 against a centrifugal force in order to flow into the fluid working chamber A.

As described above, the combination of the projection 61 and the impeller shell 22 having the above described forms suppresses flow of the working fluid from the second hydraulic chamber C into the fluid working chamber A.

Description is now be given on the operation of the torque converter 5. In the torque converter operation, the hydraulic operation mechanism (not shown) supplies the working fluid into the first hydraulic chamber B thereby increasing fluid pressure therein causing the piston 44 to move away from the front cover 14 into a lockup clutch disengagement position. The working fluid moves radially outward toward the friction portion of the piston 44 and may further flow into the second hydraulic chamber C, and then further may flow through the space between the projection 61 and the impeller shell 22 into the fluid working chamber A. In this state, the fluid pressure in the first hydraulic chamber B may be higher than the pressure in the second hydraulic chamber C so that the piston 44 and the damper mechanism 31 remain in a dis-engaged position. Thus, the friction facing of the piston 44 is kept in a position axially spaced from the friction surface of the front cover 14.

In order to cause the lockup clutch to move into an engaged position, the hydraulic operation mechanism (not shown) drains the working fluid from the first hydraulic chamber B. Thereby, the fluid pressure in the first hydraulic chamber B becomes lower than the pressure in the second hydraulic chamber C, and the piston 44 and the damper mechanism 31 move in the axial direction toward the front cover 14. Thereby, the friction facing of the piston 44 is strongly pressed against the front cover 14 so that the lockup clutch is engaged. As a result, the torque is transmitted from the front cover 14 through the lockup device 7 to the turbine hub 27, and is then output to the transmission main drive shaft (not shown).

If the lockup clutch engegement operation described above is performed in accordance with prior art configurations, the working fluid in the second hydraulic chamber C tends to flow into the fluid working chamber A because the flow velocity in the fluid working chamber A is high according to a speed ratio, e.g., in the operation region of the torque converter. In the embodiment of the present invention, however, the projection 61 formed on the turbine shell 25 suppresses the flow of the working fluid from the second hydraulic chamber C into the fluid working chamber A, and reduces the flow rate. Therefore, lowering of the pressure in the second hydraulic chamber C is prevented, and the pressure in the second hydraulic chamber C can be reliably higher than that in the first hydraulic chamber B. Consequently, the piston 44 can reliably and rapidly move toward the front cover 14. Thus, the lockup device 7 has a desired lockup response time.

Accordingly, it is possible to increase the velocity ratio region in which the lockup device 7 can operate.

The projection of the turbine shell according to the invention can also be employed in devices and structures other than the torque converter and the lockup device of the type in the foregoing embodiment of the invention.

In the torque converter according to the invention, the turbine blade is provided at its outer periphery with the projection extending toward the inner side surface of the impeller shell. This structure suppresses the flow of working fluid from the second hydraulic chamber into the torus space at the time of the lockup device coupling operation. Accordingly, the lockup response is improved.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A torque converter for transmitting torque of an engine to a transmission via a working fluid, comprising:

a front cover for receiving torque from the engine;

an impeller shell fixed to said front cover defining a fluid chamber therebetween, a plurality of impeller blades fixed to an inner side said impeller shell;

a turbine shell disposed in said fluid chamber adjacent to said impeller blades, said turbine shell and said impeller shell defining a fluid working chamber therebetween within said fluid chamber;

a stator disposed within said fluid working chamber between radially inner portions of said impeller shell and said turbine shell;

a lockup clutch mechanism disposed between said front cover and said turbine shell, said lockup clutch mechanism including a piston, a first hydraulic chamber being defined between said front cover and said piston, a second hydraulic chamber being defined between said piston and said turbine shell; and a means for restricting fluid flow between said fluid working chamber and said second hydraulic chamber.

2. The torque converter according to claim 1, wherein said means for restriction fluid flow between said fluid working chamber and said second hydraulic chamber comprises an annular flange formed on a radially outward portion of said turbine shell.

3. The torque converter according to claim 2, wherein said flange extends radially outward beyond a radially outermost edge of said impeller blades.

4. The torque converter according to claim 2 wherein said turbine shell comprises said flange and an annular portion that supports a plurality of turbine blades, said flange extending radially outward from said annular portion of said turbine shell by a distance of at least 1 mm.

5. The torque converter according to claim 2, wherein:

said flange has an outer peripheral surface and said impeller shell is formed with an outer cylindrical portion having an inner radial surface that confronts said outer peripheral surface of said flange; and said flange has an annular surface perpendicular to said outer peripheral surface, said impeller formed with an annular portion that extends between said impeller blades and said outer cylindrical portion, said annular surface of said flange confronting an adjacent surface of said annular portion of said impeller.

6. The torque converter according to claim 5, wherein said inner radial surface of said impeller shell is spaced apart from said outer peripheral surface of said flange by a distance of no more than 5 mm.

7. The torque converter according to claim 5, wherein said annular surface is spaced apart from said adjacent surface of said annular portion of said impeller by a distance of no more than 5 mm.

* * * * *